(12) United States Patent
Suh et al.

(10) Patent No.: US 7,436,758 B2
(45) Date of Patent: Oct. 14, 2008

(54) APPARATUS AND METHOD FOR TRANSMITTING/RECEIVING PILOT PATTERN SET TO DISTINGUISH BASE STATION IN ORTHOGONAL FREQUENCY DIVISION MULTIPLEXING (OFDM) COMMUNICATION SYSTEM

(75) Inventors: Chang-Ho Suh, Seoul (KR); Jung-Min Ro, Seoul (KR); Seok-Hyun Yoon, Seoul (KR); Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 629 days.

(21) Appl. No.: 10/974,413

(22) Filed: Oct. 27, 2004

(65) Prior Publication Data

US 2005/0088960 A1 Apr. 28, 2005

(30) Foreign Application Priority Data

Oct. 27, 2003 (KR) ...................... 10-2003-0075194

(51) Int. Cl.
*H04J 11/00* (2006.01)
*H04Q 7/20* (2006.01)

(52) U.S. Cl. .................... 370/203; 370/208; 370/491
(58) Field of Classification Search ................. 370/203, 370/208, 335, 342, 491
See application file for complete search history.

(56) References Cited

U.S. PATENT DOCUMENTS

| | | | |
|---|---|---|---|
| 6,567,374 B1 * | 5/2003 | Bohnke et al. ............... | 370/203 |
| 7,002,901 B2 * | 2/2006 | Yun et al. .................... | 370/209 |
| 7,218,617 B1 * | 5/2007 | Usuda et al. ................. | 370/320 |
| 2004/0114504 A1 * | 6/2004 | Jung et al. ................... | 370/203 |
| 2004/0218523 A1 * | 11/2004 | Varshney et al. ............ | 370/208 |
| 2004/0228267 A1 * | 11/2004 | Agrawal et al. ............. | 370/203 |
| 2004/0258134 A1 * | 12/2004 | Cho et al. .................... | 375/131 |
| 2005/0002369 A1 * | 1/2005 | Ro et al. ...................... | 370/342 |
| 2005/0058097 A1 * | 3/2005 | Kang et al. .................. | 370/329 |
| 2005/0111429 A1 * | 5/2005 | Kim et al. .................... | 370/344 |
| 2006/0146867 A1 * | 7/2006 | Lee et al. ..................... | 370/465 |
| 2006/0279435 A1 * | 12/2006 | Krishnan et al. .............. | 341/29 |

* cited by examiner

*Primary Examiner*—Min Jung
(74) *Attorney, Agent, or Firm*—The Farrell Law Firm, PC

(57) ABSTRACT

An apparatus and method for transmitting/receiving a pilot pattern set to distinguish a base station in an FDM communication system. The method divides a total frequency bandwidth into at least two sub-bandwidths including a plurality of sub-carriers in an OFDMA (Orthogonal Frequency Division Multiple Access) mobile communication system, configures a single frame cell (FC) using one sub-bandwidth from among the sub-bandwidths and a plurality of OFDM (Orthogonal Frequency Division Multiplexing) symbol intervals, and assigns a pilot signal to a time-frequency cell comprised of at least one OFDM symbol and at least one sub-carrier within the FC. The method includes the steps of spreading a pilot signal and a data signal using different orthogonal codes, synthesizing the spread pilot and data signals, and performing a CDM (Code Division Multiplexing) process; and mapping the CDM-processed pilot and data signals to a predetermined time-frequency cell in the FC.

22 Claims, 11 Drawing Sheets

APPARATUS AND METHOD FOR TRANSMITTING/RECEIVING PILOT PATTERN SET TO DISTINGUISH BASE STATION IN ORTHOGONAL FREQUENCY DIVISION MULTIPLEXING (OFDM) COMMUNICATION SYSTEM

PRIORITY

This application claims priority to an application entitled "APPARATUS AND METHOD FOR TRANSMITTING/RECEIVING PILOT PATTERN SET TO DISTINGUISH BASE STATION IN ORTHOGONAL FREQUENCY DIVISION MULTIPLEXING (OFDM) COMMUNICATION SYSTEM", filed in the Korean Intellectual Property Office on Oct. 27, 2003 and assigned Serial No. 2003-75194, the contents of which are incorporated herein by reference.

BACKGROUND OF THE INVENTION

1. Field of the Invention

The present invention relates to a broadband wireless communication system based on an OFDM (Orthogonal Frequency Division Multiplexing) scheme, and more particularly to an apparatus and method for generating a pilot pattern to distinguish between BSs (Base Station).

2. Description of the Related Art

A transmitter, for example a base station (BS), for use in a conventional OFDM communication system transmits pilot sub-carrier signals (pilot channel signals) to a receiver, for example a mobile station (MS). The BS transmits the data sub-carrier signals (data channel signals), and at the same time transmits the pilot channel signals. The reason the pilot channel signals are transmitted is to perform synchronization acquisition, channel estimation, and BS distinguishment.

The OFDM scheme available for high-speed data transmission in wired/wireless channels serves as an MCM (Multi Carrier Modulation) scheme, which transmits data using a multi-carrier, converts serially-received symbol streams into parallel symbol streams, modulates each symbol stream into a plurality of sub-carriers (i.e. a plurality of sub-channels) orthogonal to each other, and finally transmits the plurality of sub-carriers.

Such an MCM system was first applied to a high-frequency radio system for use in the military in the late 1950s, and the OFDM scheme for overlapping between a plurality of orthogonal sub-carriers was first studied in the late 1970s. This OFDM scheme must implement orthogonal modulation between the multi-carriers, resulting in limited system application.

The modulation/demodulation based on the OFDM scheme was developed by Weinstein in 1971, and is processed using a DFT (Discrete Fourier Transform). Many developers have conducted intensive research into the OFDM scheme. Usage of a guard interval and a method for inserting a cyclic prefix guard interval are well known to those skilled in the art. The use of a guard interval greatly reduces the negative influence on a system affected by a multi-path and a delay spread.

Therefore, the OFDM scheme is widely applied to the digital transmission technology, for example DAB (Digital Audio Broadcasting), digital TV, WLAN (Wireless Local Area Network), and a WATM (Wireless Asynchronous Transfer Mode). Although the use of the OFDM scheme has been limited due to its hardware complexity, the OFDM scheme can be implemented with digital signal processing technology such as an FFT (Fast Fourier Transform) and IFFT (Inverse Fast Fourier Transform).

The OFDM scheme is similar to a conventional FDM (Frequency Division Multiplexing) scheme, but it can obtain an optimum transmission efficiency during a high-speed data transmission because it transmits a plurality of sub-carriers that are orthogonal to each other. Further, the OFDM scheme has a superior frequency use efficiency and is very resistant to a multi-path fading, resulting in an optimum transmission efficiency during a high-speed data transmission.

Because the OFDM scheme uses an overlapped frequency spectrum, it can effectively use a frequency, is very resistant to a frequency selective fading and a multi-path fading, reduces intersymbol interference (ISI) using a guard interval, and allows for the use of an equalizer composed of simple hardware. Also, the OFDM scheme is very resistant to impulse noise, such that it is widely adapted to communication system architecture.

The pilot channel signals act as a training sequence, perform channel estimation between a transmitter and a receiver, and allow an MS to determine a BS to which the MS belongs using the pilot channel signals. The position where the pilot channel signals are transmitted is determined between the transmitter and the receiver. The pilot channel signals act as reference signals.

A pattern generated by the pilot channel signals transmitted from the BS is called a pilot pattern. The pilot patterns for use in the conventional OFDM system are distinguished by slopes of the pilot channel signals and start points at which the pilot channel signals begin their transmissions. The OFDM communication system must be designed for individual BSs to have different pilot patterns such that the BSs for the OFDM communication system can be distinguished from each other.

The pilot patterns are generated by taking into consideration a coherence bandwidth and a coherence time. The coherence bandwidth is indicative of a maximum bandwidth on the assumption that the same channel is used in a frequency domain (i.e. a channel remains unchanged in the frequency domain). The coherence time is indicative of a maximum time on the assumption that the same channel is used in a time domain (i.e. a channel remains unchanged in the time domain).

It can be assumed that the same channel is used for the coherence bandwidth and the coherence time, such that there are no problems associated with synchronization acquisition, channel estimation, and BS distinguishment even though the coherence bandwidth and the coherence time transmit only one pilot channel signal. Further, the transmission of the data channel signals can be maximized, resulting in improved overall system performance.

A minimum frequency interval for the transmission of pilot channel signals is indicative of a coherence bandwidth. A minimum time interval (i.e. a minimum OFDM symbol time interval) for transmitting the pilot channel signals is indicative of a coherence time.

Although the number of BSs contained in the OFDM communication system is variable with the size of the OFDM communication system, the larger the size of the OFDM communication system, the greater the number of the BSs. In order to distinguish the BSs from each other, the number of pilot patterns having different slopes and different start points must be equal to the number of the BSs.

An example of a variety of pilot channel patterns will be described with reference to FIG. 1.

FIG. 1 depicts all of the slopes that can be generated in the form of a pilot channel pattern in the conventional OFDM communication system.

Referring to FIG. 1, the slopes that can be generated in the form of a pilot channel pattern and the number of the slopes (i.e. the slopes in response to pilot channel signal transmission, and the number of the slopes) are limited by the coherence bandwidth 101 and the coherence time 102.

Assuming that the coherence bandwidth 101 is determined to be '6', the coherence time 102 is determined to be '1', and the pilot pattern slope is an integer, a slope S of a pilot pattern that can be generated is determined to be S=0, S=1, S=2, S=3, S=4, and S=5, such that the number of the slopes S is equal to '6'. In more detail, the slope S of the pilot pattern that can be generated is determined to be one of the integers 0~5.

In this case, if the number of pilot pattern slopes is '6', this means that the number of BSs distinguishable by the pilot pattern in the OFDM communication system satisfying the aforementioned assumption is '6'.

A pilot sub-carrier having a pilot pattern slope S of 6 (i.e. S=6) will hereinafter be described. Indeed, a first case in which the pilot pattern slope S is 0 and a second case in which the pilot pattern slope S is 6 are not distinguished from each other, such that only one of the first case and the second case is available. The pilot sub-carrier having the pilot pattern slope S of 6 can also be denoted by S=0, in which S is indicative of another pilot pattern slope S spaced apart from the pilot sub-carrier by the coherence bandwidth 101, such that the first case of S=0 and the second case of S=6 are not distinguishable from each other.

The hashed circle of FIG. 1 is a pilot sub-channel signal spaced apart from the pilot sub-carrier by the coherence bandwidth 101. If the slope S of the pilot sub-carrier denoted by the white circle is denoted by S=6, then the slope S of the pilot sub-carrier denoted by the hashed circle can also be determined to be '0'. The slope of the pilot sub-carrier is limited to the coherence bandwidth 101.

An OFDMA-CDM (Orthogonal Frequency Division Multiple Access-Code Division Multiplexing) system will hereinafter be described.

FIG. 2 depicts a method for dividing time-frequency resources in the OFDMA-CDM system. Referring to FIG. 2, a unit square is composed of predetermined sub-carriers (e.g., 8 sub-carriers), and is defined as a TFC (Time-Frequency Cell) 201 having the same duration as a single OFDM symbol interval. A Frame Cell (FC) 203 is defined as a time-frequency domain, which includes a bandwidth equal to an integer multiple (e.g., 16 times) of the TFC 201 and a duration equal to an integer multiple (e.g., 8 times) of the TFC 201.

FCs of FIG. 2 are classified into FCs for packet data transmission and other FCs for the transmission of control information associated with the sub-channels over which the packet data is transmitted. Two sub-channels with different hopping patterns of a predetermined frequency interval are shown in the packet data transmission FC. In more detail, the sub-channel A and the sub-channel B are shown in FIG. 2.

In more detail, the OFDMA-CDM scheme shown in FIG. 2 adapts the characteristics of the OFDM scheme and the other characteristic of the CDMA scheme to maximize a performance gain. The total bandwidth in the OFDMA-CDM scheme is divided into a plurality of sub-carrier domains (i.e. a plurality of sub-frequency domains).

The frequency domain $\Delta f_{TFC}$, which has the same duration $\Delta t_{TFC}$ as the OFDM symbol interval and is composed of predetermined sub-frequency domains, is defined as a TFC 201. The TFC 201 is composed of predetermined sub-frequency domains.

The number of sub-frequency domains that comprises the TFC 201 varies with system conditions. The frequency domain occupied by the TFC 201 is defined as a TFC frequency domain, and the time domain occupied by the TFC 201 is defined as a TFC time interval. As a result, the unit squares 201 shown in FIG. 2 depict the TFCs.

The data processing step based on the CDMA scheme includes a step for spreading data by a channelization code assigned to every sub-carrier and/or a step for scrambling the spread data using a predetermined scrambling code.

A single FC 203 is comprised of the TFCs. The FC 203 includes a bandwidth $\Delta f_{FC}$ corresponding to a predetermined multiple, instead of including $\Delta f_{TFC}$ indicative of the bandwidth of the TFC 201, and includes a duration $\Delta t_{FC}$ corresponding to a predetermined multiple, instead of including $\Delta t_{TFC}$ indicative of the duration of the TFC. For example, the FC 203 includes a bandwidth corresponding to 16 times of the TFC 201's bandwidth $\Delta f_{TFC}$ as denoted by $\Delta f_{FC} = 16 \Delta f_{TFC}$, and includes a duration corresponding to 8 times of the TFC's duration $\Delta t_{TFC}$ as denoted by $\Delta t_{FC} = 8 \Delta t_{TFC}$. In this case, the frequency domain occupied by the FC is defined as an FC frequency domain, and the time domain occupied by the FC is defined as an FC time domain.

The first FC to the (M−1)-th FC from among the M FCs are adapted to transmit packet data, an M-th FC may be adapted to transmit control information. Needless to say, the number of FCs used for the packet data transmission and the number of FCs used for the control information transmission are variably determined according to the system conditions. The greater the number of the FCs used for the control information transmission, the lesser the number of the FCs used for the packet data transmission, which results in a problem of data transfer rate deterioration. The number of the FCs used for the packet data transmission and the number of the FCs used for the control information transmission are determined taking into consideration this problem. For the convenience of description, the FC used for the packet data transmission is called a data FC (Frame Cell), and the other FC used for the control information transmission is called a control FC (Frame Cell).

Two different sub-channels (i.e. the sub-channel A and the sub-channel B) in a single FC are shown in FIG. 2. In this case, the sub-channel is indicative of a transmission channel in which the predetermined TFCs are frequency-hopping processed with time according to a predetermined frequency hopping pattern. It should be noted that the number of TFCs contained in the sub-channel and the frequency hopping pattern are variably determined depending on the system conditions. FIG. 2 depicts an exemplary case in which a single sub-channel is composed of 8 TFCs.

In the case of adapting a pilot transmission method of the conventional OFDM system to the OFDMA-CDM system, pilot spreading is not performed whereas data spreading is performed, such that a method for multiplexing the data signals and pilot signals becomes troublesome. A variety of intervals (i.e. various intervals from a narrow interval to a wide interval) from one pilot signal to its neighboring pilot signal must be used in the frequency domain to increase the number of pilot signal patterns in such a way that the BSs can be distinguished from each other. In this case, the interval between the pilots signals may be greater than the coherence bandwidth. If BS distinguishment and channel estimation are performed using the pilot signals, channel estimation performance may be deteriorated.

SUMMARY OF THE INVENTION

Therefore, the present invention has been made in view of the above and other problems, and it is an object of the present invention to provide an apparatus and method for transmitting/receiving a pilot pattern set to effectively distinguish a BS in an OFDMA-CDM communication system.

It is another object of the present invention to provide an apparatus and method for generating a pilot pattern set to effectively distinguish a BS in an OFDMA-CDM communication system.

It is yet another object of the present invention to provide an apparatus and method for maximizing the number of pilot patterns to distinguish a BS in an OFDMA-CDM communication system.

In accordance with one aspect of the present invention, the above and other objects can be accomplished by the provision of a method for dividing a total frequency bandwidth into at least one sub-bandwidth that includes a plurality of sub-carriers in an OFDMA (Orthogonal Frequency Division Multiple Access) mobile communication system, configures a single frame cell (FC) using one sub-bandwidth from among the sub-bandwidths and a plurality of OFDM (Orthogonal Frequency Division Multiplexing) symbol intervals, and assigns a pilot signal to a time-frequency cell includes of at least one OFDM symbol and at least one sub-carrier within the FC, the method comprising the steps of spreading a pilot signal and a data signal, which are to be transmitted, using different orthogonal codes, synthesizing the spread pilot and data signals, and performing a CDM (Code Division Multiplexing) process; and mapping the CDM-processed pilot and data signals to a predetermined time-frequency cell in the FC.

In accordance with another aspect of the present invention, there is provided a method for dividing a total frequency bandwidth into at least one sub-bandwidth that includes a plurality of sub-carriers in an OFDMA (Orthogonal Frequency Division Multiple Access) mobile communication system, configures a single frame cell (FC) using one sub-bandwidth from among the sub-bandwidths and a plurality of OFDM (Orthogonal Frequency Division Multiplexing) symbol intervals, assigns a pilot signal to a time-frequency cell that includes at least one OFDM symbol and at least one sub-carrier within the FC, and distinguishes a BS (Base Station), the method includes the steps of determining an orthogonal code for each FC such that the orthogonal code performs a CDM (Code Division Multiplexing)—process of a pilot signal according to a BSID (Base Station Identifier); spreading a pilot signal to be transmitted to every FC using the determined orthogonal code, spreading a data signal to be transmitted using another code instead of using the determined orthogonal code, synthesizing the spread pilot and data signals, and CDM-processing the synthesized result; and mapping the CDM-processed pilot and data signals to a predetermined time-frequency cell contained in the FC.

In accordance with yet another aspect of the present invention, there is provided a method for dividing a total frequency bandwidth into at least one sub-bandwidth including a plurality of sub-carriers in an OFDMA (Orthogonal Frequency Division Multiple Access) mobile communication system, configuring a single frame cell (FC) using one sub-bandwidth from among the sub-bandwidths and a plurality of OFDM (Orthogonal Frequency Division Multiplexing) symbol intervals, assigning a pilot signal to a time-frequency cell that includes at least one OFDM symbol and at least one sub-carrier within the FC, and receiving the assigned pilot signal, the method including the steps of FFT (Fast Fourier Transform)—processing a reception signal for each FC, and despreading the FFT-processing result using at least one orthogonal code used for the CDM process in a transmission mode; and determining an orthogonal code having a maximum despreading result value, combining orthogonal codes determined for every FC, and distinguishing a BS.

In accordance with yet another aspect of the present invention, there is provided an apparatus for dividing a total frequency bandwidth into at least one sub-bandwidth that includes a plurality of sub-carriers in an OFDMA (Orthogonal Frequency Division Multiple Access) mobile communication system, configuring a single frame cell (FC) using one sub-bandwidth from among the sub-bandwidths and a plurality of OFDM (Orthogonal Frequency Division Multiplexing) symbol intervals, and assigning a pilot signal to a time-frequency cell that includes at least one OFDM symbol and at least one sub-carrier within the FC, the apparatus includes a pilot code pattern set generator for determining an orthogonal code for each FC such that the orthogonal code performs a CDM (Code Division Multiplexing)—process of a pilot signal according to a BSID (Base Station Identifier); a pilot spread-spectrum unit for spreading a pilot signal to be transmitted during each FC using the orthogonal code determined by the pilot code pattern set generator; a data spread-spectrum unit for spreading a data signal to be transmitted during each FC using another code, instead of using the orthogonal code determined by the pilot code pattern set generator; an adder for synthesizing the pilot signal spread by the pilot spread-spectrum unit and the data signal spread by the data spread-spectrum unit in each of the FCs, and CDM-processing the synthesized result; and an IFFT (Inverse Fast Fourier Transform) unit for mapping the CDM-processed pilot and data signals to a predetermined time-frequency cell contained in the FC.

In accordance with yet another aspect of the present invention, there is provided an apparatus for dividing a total frequency bandwidth into at least one sub-bandwidth that includes a plurality of sub-carriers in an OFDMA (Orthogonal Frequency Division Multiple Access) mobile communication system, configuring a single frame cell (FC) using one sub-bandwidth from among the sub-bandwidths and a plurality of OFDM (Orthogonal Frequency Division Multiplexing) symbol intervals, assigning a pilot signal to a time-frequency cell that includes at least one OFDM symbol and at least one sub-carrier within the FC, and receiving the assigned pilot signal, the apparatus includes an FFT (Fast Fourier Transform) unit for FFT-processing a received signal for each FC; and a BS (Base Station) detector for dispreading the received signal using at least one orthogonal code used for a CDM (Code Division Multiplexing) process in a transmission mode in order to detect an orthogonal code, combining orthogonal codes detected in individual FCs, and distinguishing a BS.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
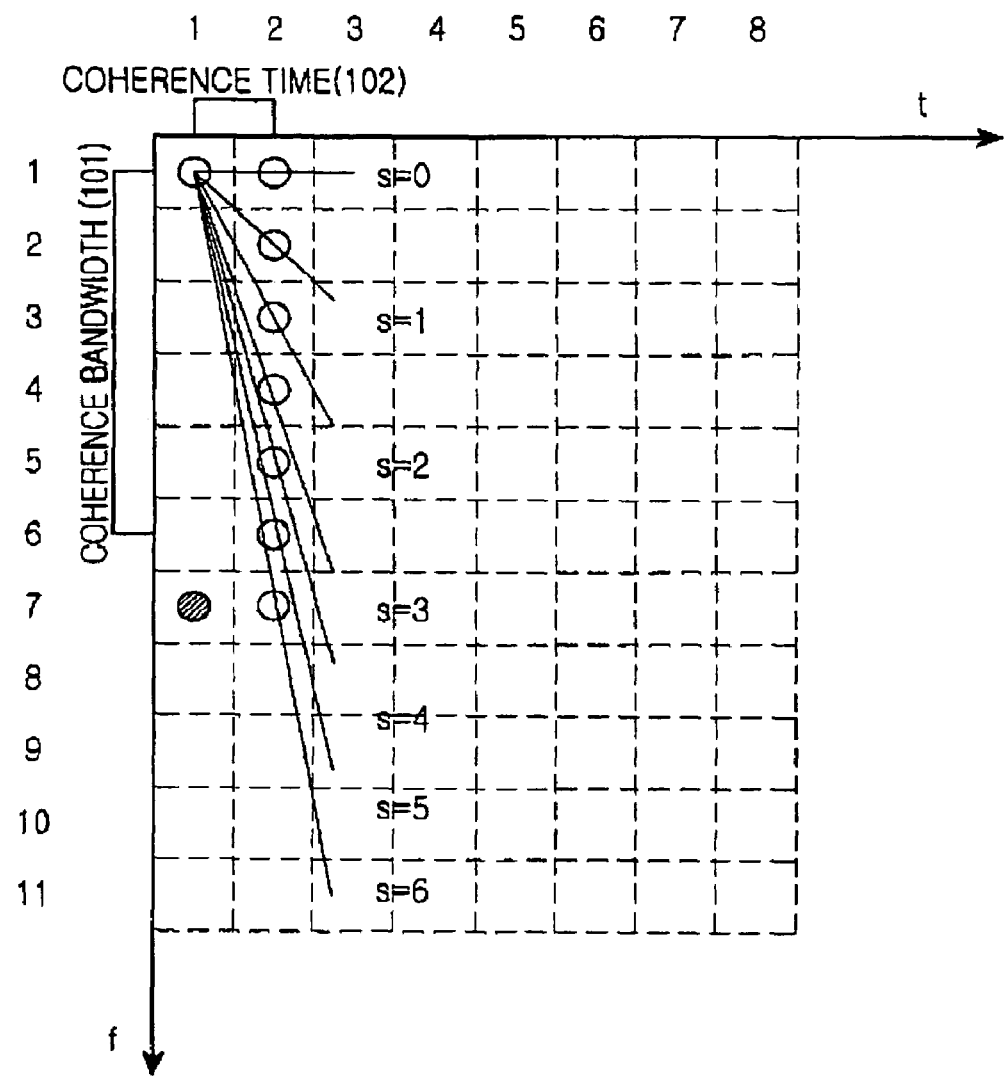
FIG. 1 depicts the transmission locations of the pilot channel signals according to a pilot pattern using a single pilot sub-carrier in a conventional OFDM communication system.

Now, preferred embodiments of the present invention will be described in detail with reference to the annexed drawings. In the drawings, the same or similar elements are denoted by the same reference numerals even though they are denoted by different drawings. In the following description, a detailed description of known functions and configurations incorporated herein will be omitted when it may obscure the subject matter of the present invention.

A method for effectively generating a pilot pattern in an OFDMA-CDM system will hereinafter be described. In accordance with the present invention, data corresponding to individual sub-frequency domains assigned to the TFC is processed by the CDMA scheme, and is then processed by sub-carriers corresponding to the sub-frequency domains.

Although data is spread in TFC units in the conventional OFDMA-CDM system, a pilot signal is not spread in the same TFC units, resulting in an increased complexity of the system implementation. However, the present invention can spread the pilot signal in the same manner as the data, such that a transmission can be readily implemented. Therefore, a pilot pattern and a BS can be distinguished from each other according to a spreading code of the pilot signal, such that many more BSs can also be distinguished from each other.

Figure 2:
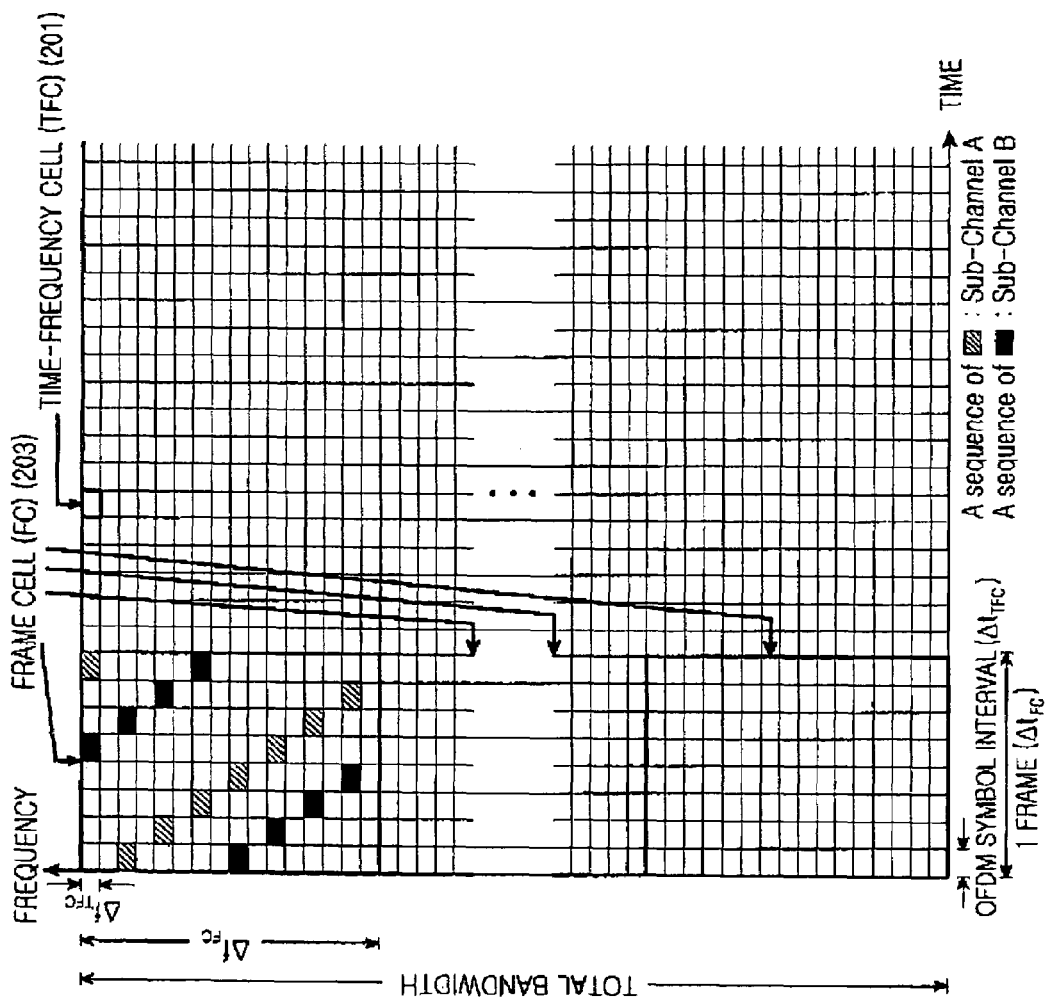
FIG. 2 is a diagram illustrating a method for mapping the data corresponding to the individual channels to a frame cell (FC) in the OFDMA-CDM system.
Figure 3:
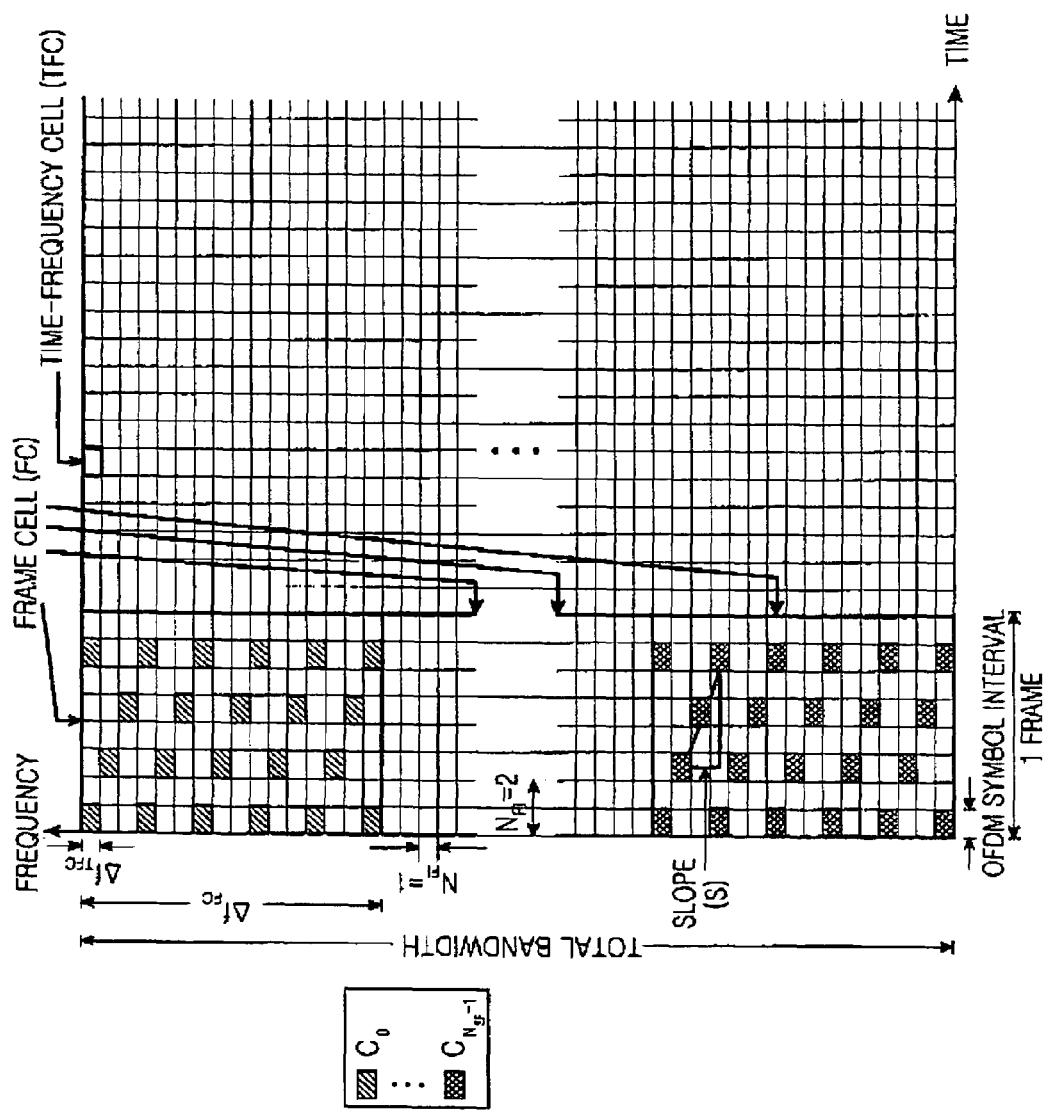
FIG. 3 is a diagram illustrating a pilot mapping process for use in an OFDMA-CDM system in accordance with a preferred embodiment of the present invention.
Figure 4:
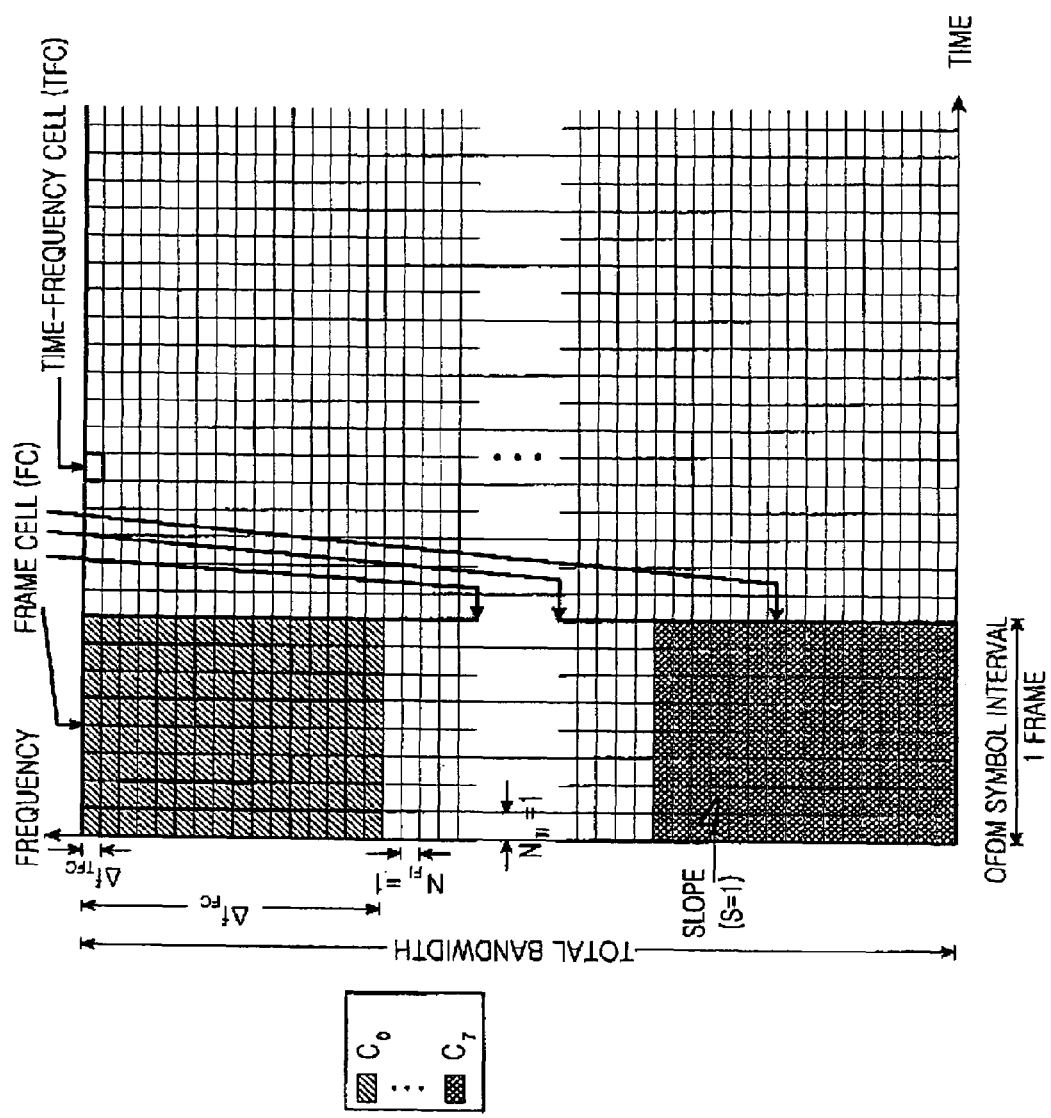
FIG. 4 is a diagram illustrating a pilot mapping process for use in an OFDMA-CDM system in accordance with a preferred embodiment of the present invention.

A frame structure of an OFDMA-CDM system shown in FIGS. 3 and 4 is indicative of a frame structure of the OFDMA-CDM system described in FIG. 2. In this case, the X-axis is a function of time, and the Y-axis is a function of frequency.

A plurality of terms are defined in FIG. 2 for the convenience of description. The TFC is an allocation resource composed of a single OFDM symbol time interval and a predetermined frequency interval $\Delta f_{TFC}$, and is a minimum unit for storing data therein. The FC is an allocation resource composed of a plurality of OFDM symbol time intervals and a plurality of frequency intervals $\Delta f_{TFC}$ ($=\Delta f_{FC}$), such that a sub-bandwidth is determined by the FC. In other words, $\Delta f_{FC}$ is a sub-bandwidth size. Finally, the sub-channel is a successive data unit, such that a plurality of sub-channels may be assigned to one FC.

A pilot mapping process in a time-frequency domain according to a preferred embodiment of the present invention will hereinafter be described with reference to FIG. 3.

FIG. 3 is a diagram illustrating a pilot mapping process for use in an OFDMA-CDM system in accordance with a preferred embodiment of the present invention.

Referring to FIG. 3, the time-frequency domain forms a predetermined frame frequency $\Delta f_{FC}$ and a predetermined frame duration. The FC is composed of a plurality of TFCs. Each TFC is composed of an OFDM symbol interval and a frequency interval composed of $N_{SF}$ sub-carriers (where $N_{SF}$ is indicative of a spreading value). For example, if the spreading factor is '8', the TFC is composed of 8 sub-carriers. The pilot signal is spread by the spreading value $N_{SF}$, and is mapped with a predetermined TFC of individual FCs. In this case, the mapping regulation between the pilot signal and the FC may be determined by the following parameters $N_{FI}$, $N_{TI}$, and S.

Firstly, The $N_{FI}$ is an interval from one pilot signal to a neighboring pilot signal in a frequency interval, and its unit is denoted by $\Delta f_{TFC}$. The $N_{TI}$ is an interval from one pilot signal to a neighboring pilot signal in a time interval, and its unit is equal to an OFDM symbol interval. The slope S is the ratio of a frequency interval between corresponding pilot signals to a time interval of the next pilot signal. In FIG. 3, $N_{SF}$ is determined to be '8' (i.e. $N_{SF}=8$), $N_{FI}$ is determined to be '1' ($N_{FI}=1$), and $N_{TI}$ is determined to be '2' ($N_{TI}=2$), such that the slope S is determined to be '½' by $N_{FI}=1$ and $N_{TI}=2$ as denoted by $N_{FI}/N_{TI}=\frac{1}{2}$.

A spreading code for use in a pilot signal mapped with individual FCs may be determined any one of $[C_0, C_1, \ldots, C_{N_{SF}-1}]$, and different spreading codes may be used for the individual FCs.

Orthogonality between the spreading codes must be satisfied. For example, a Walsh code may be used as the orthogonal code. One of the $N_{SF}$ spreading codes is selected for a 0-th FC, the pilot signal is spread and mapped. In this manner, the pilot signal can also be independently spread in the remaining FCs.

Therefore, if the number of FCs is determined to be $N_{SB}$, an available spreading code method results in $N_{SF}^{N_{SB}}$. For example, if the number of FCs is determined to be '5' (i.e. $N_{SB}=5$) and the number of spreading codes is determined to be '8' (i.e. $N_{SF}=8$), an available spreading code method results in $8^5$. In this case, if individual BSs are assigned unique IDs, different spreading code methods may be selected using the unique IDs. The spreading code methods will be described later, such that its detailed description will herein be omitted for the convenience of description.

In brief, pilot mapping patterns for every FC may be defined according to a predetermined slope, and the pilot signal may be mapped according to the same slope in association with all of the FCs. If the pilot signal is code-multiplexed in the individual TFCs and mapped with a predetermined position of a corresponding FC, an orthogonal code assigned to the pilot signal may be determined according to the individual FCs. In this manner, many more BSs can be distinguished from each other on the basis of the pilot patterns for every FC and the orthogonal codes.

If the number of the spreading codes is determined to be '8', one orthogonal code is assigned to a pilot signal in a TFC that contains the pilot signal, and the data is assigned to the remaining orthogonal codes. The data is assigned to 8 orthogonal codes in another TFC having no pilot signal. The aforementioned assignment method may be differently determined for every FC, and is able to distinguish many more BSs from each other on the basis of a pilot mapping pattern differently determined for every FC and codes assigned for every FC.

A method for generating a BS distinguishment pattern according to another preferred embodiment of the present invention will hereinafter be described with reference to FIG. 4. In FIG. 4, a pilot pattern is not configured by forming a pattern in response to a predetermined slope differently from FIG. 3, but the slope is determined to be '1' such that the pilot is contained in all the TFCs.

FIG. 4 is a diagram illustrating a pilot mapping process for use in an OFDMA-CDM system in accordance with a preferred embodiment of the present invention.

Referring to FIG. 4, an FC (i.e. a sub-band) in a time-frequency domain is determined by a predetermined frame frequency $\Delta f_{FC}$ and a frame duration in the same manner as in FIG. 3. The FC is composed of a plurality of TFCs, and the TFC is composed of an OFDM symbol interval and a frequency interval including $N_{SF}$ sub-carriers.

In accordance with a second preferred embodiment of the present invention, the pilot is spread by $N_{SF}$, and is mapped with the individual FCs on the basis of $N_{FI}$, $N_{TI}$, and S. In this case, the $N_{FI}$ is an interval from one pilot signal to its neighboring pilot signal in a frequency interval, and its unit is denoted by $\Delta f_{TFC}$. The $N_{TI}$ is an interval from one pilot signal to a neighboring pilot signal in a time interval and its unit is equal to an OFDM symbol interval. The S is the ratio of a frequency interval between corresponding pilot signals to a time interval from the pilot signals to the next pilot signal, and is a slope.

For example, in FIG. 4, $N_{SF}$ is determined to be '8' (i.e., $N_{SF}$=8), $N_{FI}$ is determined to be '1' ($N_{FI}$=1), $N_{TI}$ is determined to be '1' ($N_{TI}$=1), and the slope S is determined to be '1' (S=$N_{FI}/N_{TI}$=1/1=1). A spreading code used by the pilot mapping-processed with individual FCs is determined to be one of $C_0, \ldots, C_7$. Individual FCs may use different spreading codes. In this case, the orthogonality between the spreading codes must be satisfied. For example, the Walsh code may be used as the orthogonal code. In more detail, one of 8 spreading codes contained in the 0-th FC is selected, the pilot signal is spread and mapped, and such pilot spreading/mapping is independently applied to the remaining FCs.

Therefore, if the number of FCs is determined to be '5', the available spreading code method results in $8^5$. If individual BSs are assigned unique IDs, different spreading code methods may be selected using the unique IDs. The spreading code methods will be described later with reference to FIG. 11, such that its detailed description will herein be omitted for the convenience of description.

A pilot pattern transmitter for use in an OFDMA-CDM system according to the present invention will hereinafter be described with reference to FIG. 5.

Figure 5:
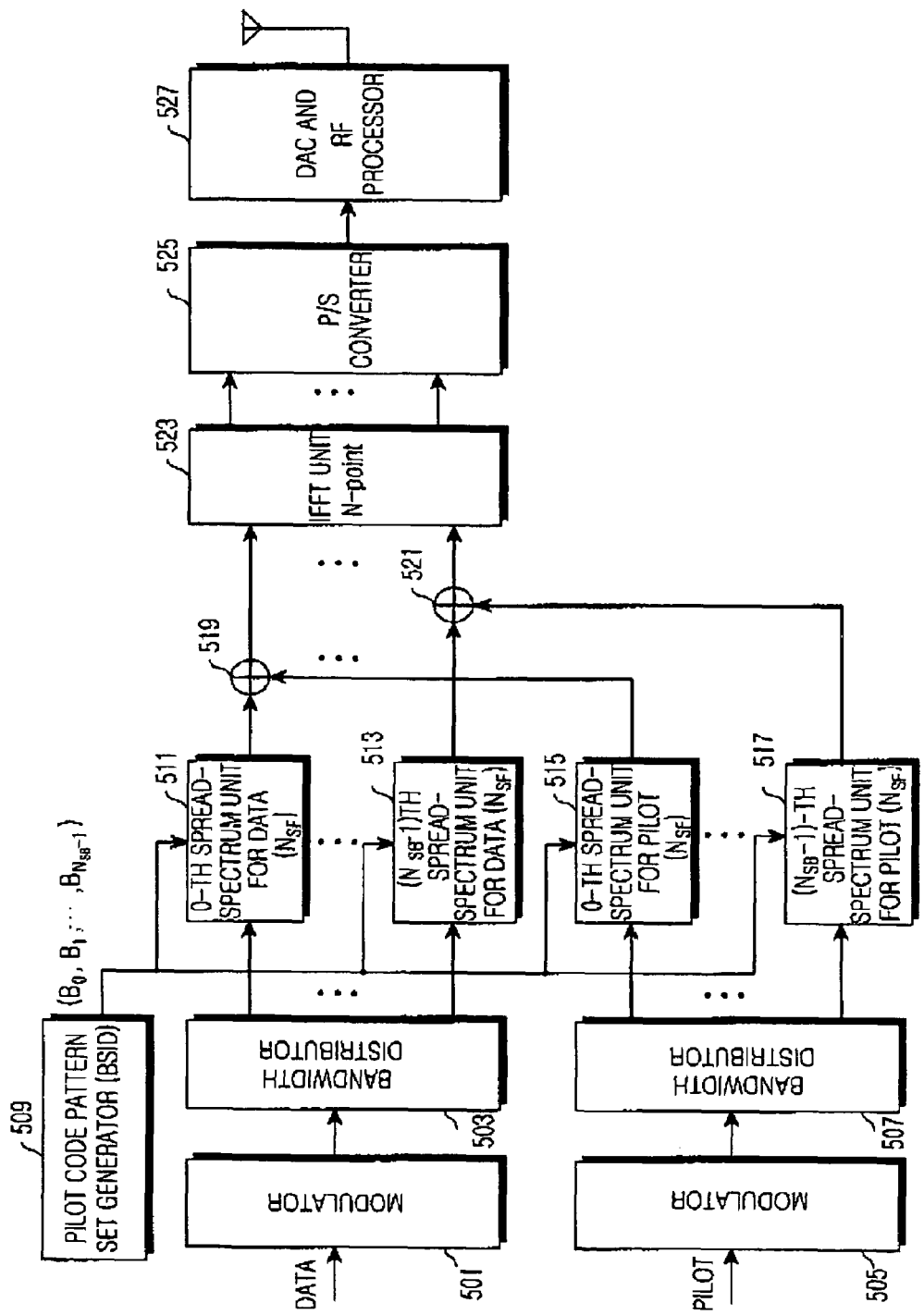
FIG. 5 is a block diagram illustrating a transmitter for use in an OFDMA-CDM system in accordance with a preferred embodiment of the present invention.

FIG. 5 is a block diagram illustrating a transmitter for use in an OFDMA-CDM system in accordance with a preferred embodiment of the present invention.

Referring to FIG. 5, data to be transmitted is applied to a modulator 501 and a bandwidth distributor 503, and is then applied to spread-spectrum units 511 and 513 for $N_{SB}$ data according to the individual bands. Also, the pilot signal is applied to a modulator 505 and a bandwidth distributor 507, and is then transmitted to spread-spectrum units 517 and 519 for $N_{SB}$ pilot signals according to the individual bands. A pilot code pattern set generator 509 generates a pilot code pattern set $[B_0, B_1, \ldots, B_{N_{SB}-1}]$ using a BSID (Base Station IDentifier), and transmits the pilot code pattern set $[B_0, B_1, \ldots, B_{N_{SB}-1}]$ to the spread-spectrum units 511 and 513 for the data and the spread-spectrum units 515 and 517 for the pilot signal. In this case, $B_i$ is indicative of a code category used in an i-th band.

Therefore, the 0-th spread-spectrum unit 511 between the spread-spectrum units 511 and 513 for data spreads data using the remaining codes other than a code indicated by $B_0$. The ($N_{SB}$-1)-th spread-spectrum unit 513 spreads data using the remaining codes other than a code indicated by $B_{N_{SB}-1}$.

The 0-th spread-spectrum unit 515 between the spread-spectrum units 515 and 517 for the pilot signals spreads the pilot signal using the code indicated by $B_0$. In this manner, the ($N_{SB}$-1)-th spread-spectrum unit 517 spreads the pilot signal using the code indicated by $B_{N_{SB}-1}$.

A 0-th bandwidth adder 519 adds a data part generated from the spread-spectrum unit 511 for the data and a pilot signal part generated from the spread-spectrum unit 515 for the pilot signal, and transmits the added result to the 0-th bandwidth part of an IFFT (Inverse Fast Fourier Transform) unit 523. In this manner, a ($N_{SB}$-1)-th bandwidth adder 521 adds a data part generated from the spread-spectrum unit 513 for the data and a pilot signal part generated from the spread-spectrum unit 517 for the pilot signal, and transmits the added result to the ($N_{SB}$-1)-th bandwidth. The output values of the adders 519 and 521 are applied to an N-point IFFT unit 523, a P/S (Parallel to Serial) converter 525, and a DAC (Digital to Analog Converter) and RF (Radio Frequency) processor 527, and is transmitted to the air interface over an antenna.

Therefore, in association with $N_{SB}$ bandwidths, a pilot signal is spread in a code corresponding to each $B_i$ of the BSID from among $N_{SF}$ codes, and the data is spread in the remaining codes other than the above code.

A reception process for use in the OFDMA-CDM system will hereinafter be described with reference to FIG. 6.

Figure 6:
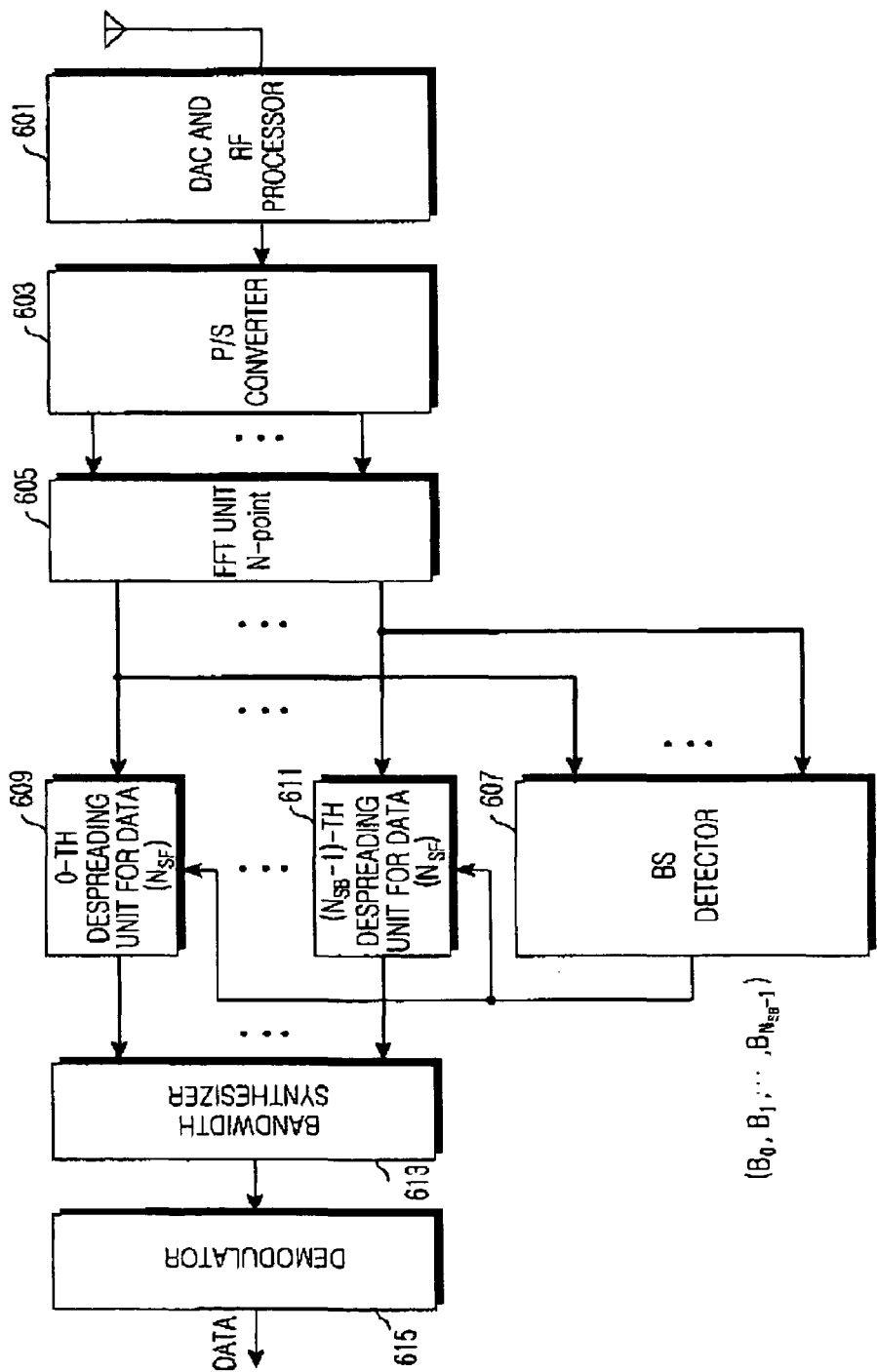
FIG. 6 is a block diagram illustrating a receiver for use in an OFDMA-CDM system in accordance with a preferred embodiment of the present invention.

FIG. 6 is a block diagram illustrating a receiver for use in an OFDMA-CDM system in accordance with a preferred embodiment of the present invention.

Referring to FIG. 6, the data transmitted from the OFDMA-CDM communication system is transmitted to real RF (Radio Frequency) channel environments such as a multipath channel, and further include a noise component, such that it is received via an antenna of the OFDMA-CDM communication system receiver. The data received via the antenna is transmitted to the DAC and RF processor 601, and is then transmitted to an S/P (Serial to Parallel) converter 603. S/P-converted reception data from the S/P converter 603 is transmitted to the N-point FFT unit 605, and is transmitted to a plurality of despreading units 609 and 611 and a BS detector 607.

The BS detector 607 generates a pilot code generation pattern set $[B_0, B_1, \ldots, B_{N_{SB}-1}]$ using the data generated after the FFT unit 605 performs an N-point FFT process. A detailed operation of the BS detector 607 will hereinafter be described with reference to FIG. 7. The 0-th spread-spectrum unit 609 for data despreads the data using the remaining codes other than the code used for the pilot signal spreading. The ($N_{SB}$-1) spread-spectrum unit 611 for data despreads data using the remaining codes other than the code indicated by $B_{N_{SB}-1}$. Thereafter, the despread data from the despreading units 609 and 611 is transmitted to a bandwidth synthesizer 613 and a demodulator 615, resulting in the recovery of the data.

A BS detection process performed by the BS detector 607 in the OFDMA-CDM system will hereinafter be described with reference to FIG. 7.

Figure 7:
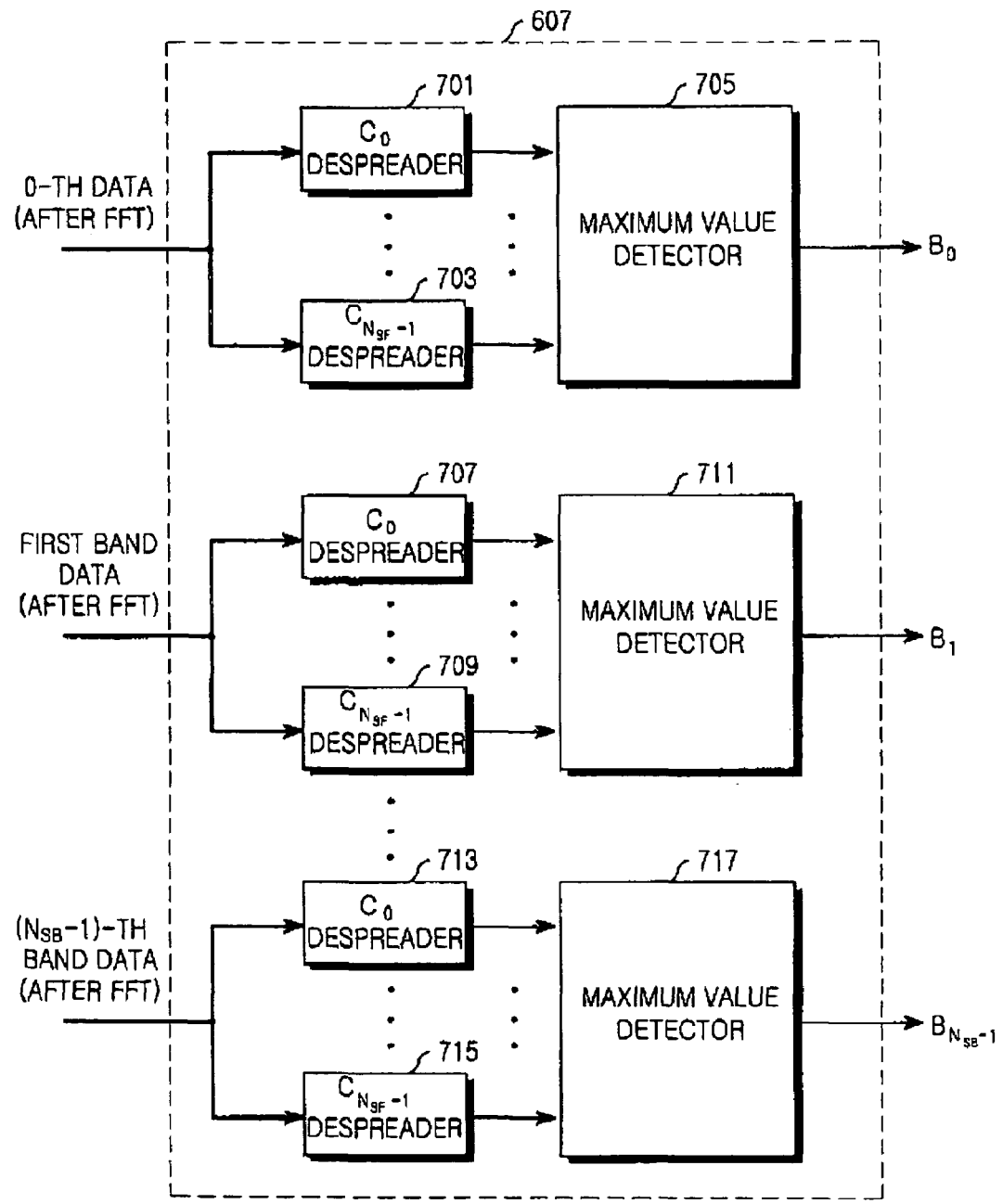
FIG. 7 is a block diagram illustrating a BS detector for use in an OFDMA-CDM system in accordance with a preferred embodiment of the present invention.

FIG. 7 is a block diagram illustrating the BS detector for use in the OFDMA-CDM system in accordance with a preferred embodiment of the present invention.

Referring to FIG. 7, the 0-th bandwidth data from among the data generated after the FFT process is transmitted to a $C_0$ despreader 701 and a $C_{N_{SF}}$-1 despreader 703. The despreaders 701 and 703 despreads the data, a value generated after the despreading process is transmitted to a maximum value detector 705. The maximum value detector 705 selects the highest-value code from among a plurality of transmission values, and outputs the selected code. In this case, the output value is called a $B_0$. In the meantime, a variety of values $B_1$, ..., $B_{N_{SF}-1}$ are generated in the first to ($N_{SB}$-1) bandwidths. As described above, the detected $B_0$ and $B_1$, ..., $B_{N_{SF}-1}$ are checked such that a BS can be identified. Therefore, the bandwidth despreaders 609 and 611 for the data in FIG. 6 performs data despreading using a code used for the pilot signals classified according to the individual bandwidths.

A transmission process for use in the OFDMA-CDM system will hereinafter be described with reference to FIG. 8.

Figure 8:
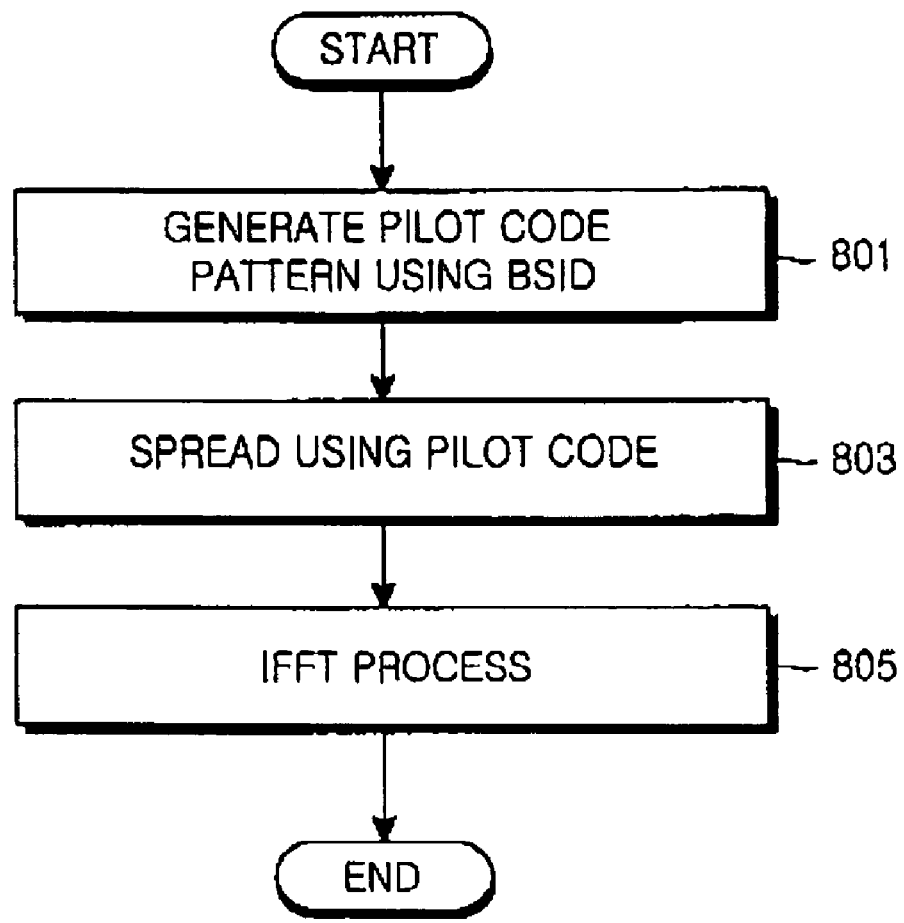
FIG. 8 is a flow chart illustrating a transmission process for use in an OFDMA-CDM system in accordance with a preferred embodiment of the present invention.

FIG. 8 is a flow chart illustrating a transmission process for use in an OFDMA-CDM system in accordance with a preferred embodiment of the present invention.

Referring to FIG. 8, the pilot code pattern generator generates a pilot code pattern using a BSID at step 801. The data is transmitted to an adder via a bandwidth distributor and a spread-spectrum unit for the data at step 803. The pilot signal is transmitted to an adder via a modulator, a bandwidth distributor, and a spread-spectrum unit for the pilot signal. In this case, the spread-spectrum unit for the data spreads the data using the remaining codes other than a pilot signal code, and the other spread-spectrum unit for the pilot signal spreads the pilot signals using a pilot signal code.

The transmitted data and the pilot signals are added by the adder and the added result is transmitted to the IFFT unit at step 805. The output data of the IFFT unit is transmitted to the P/S converter, and is transmitted to the air interface via the DAC and RF processor.

A reception process for use in the OFDMA-CDM system will hereinafter be described with reference to FIG. 9.

Figure 9:
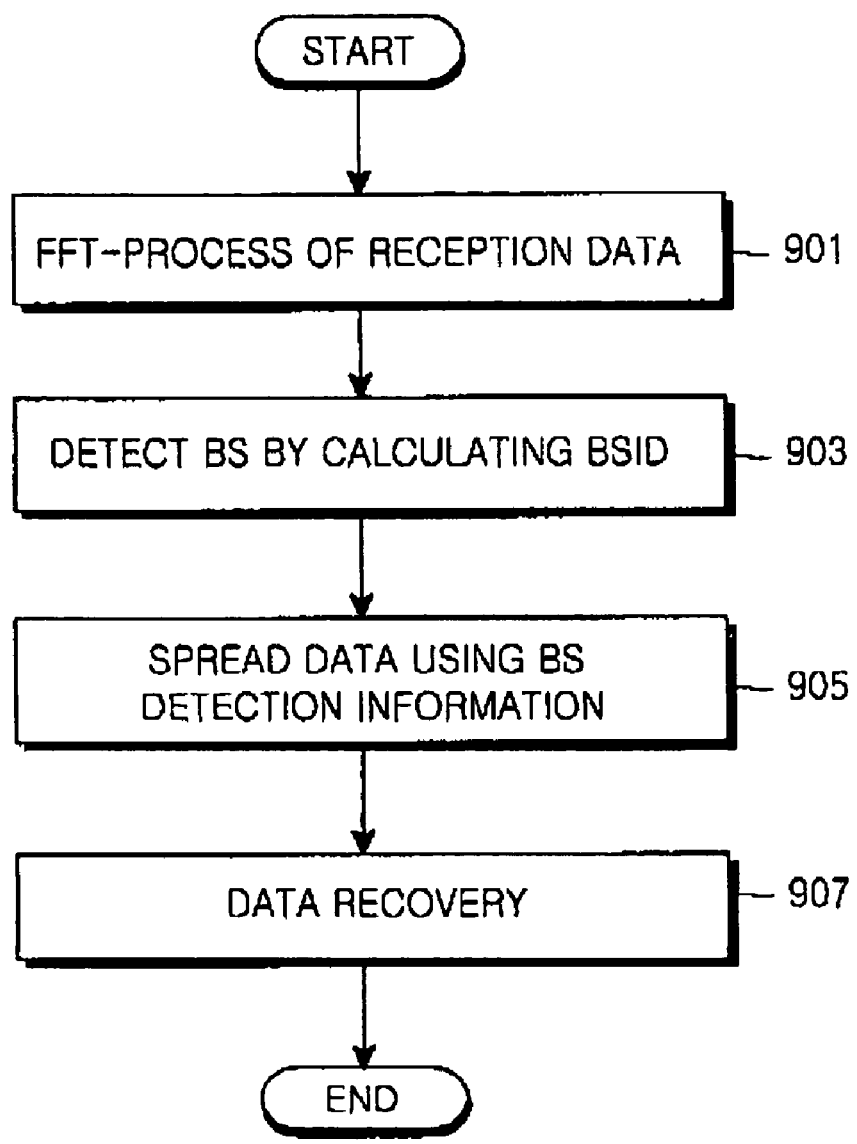
FIG. 9 is a flow chart illustrating a reception process for use in an OFDMA-CDM system in accordance with a preferred embodiment of the present invention.

FIG. 9 is a flow chart illustrating a reception process for use in an OFDMA-CDM system in accordance with a preferred embodiment of the present invention.

Referring to FIG. 9, data generated from the DAC and RF processor is transmitted to the FFT unit via the S/P converter at step 901. The reception data is transmitted to the spread-spectrum unit for data despreads and the BS detector according to a bandwidth prescribed after the FFT process at step 903. The BS detector calculates the BSID using the aforementioned method, detects the BS, and transmits the detected information to the despreader for the data at step 905. Finally, the despreader for the data performs data spreading using the information received from the BS detector, and the spreading result is transmitted to the bandwidth synthesizer and the modulator/demodulator, resulting in data recovery at step 907.

A pilot mapping process for use in the OFDMA-CDM system will hereinafter be described with reference to FIG. 10.

Figure 10:
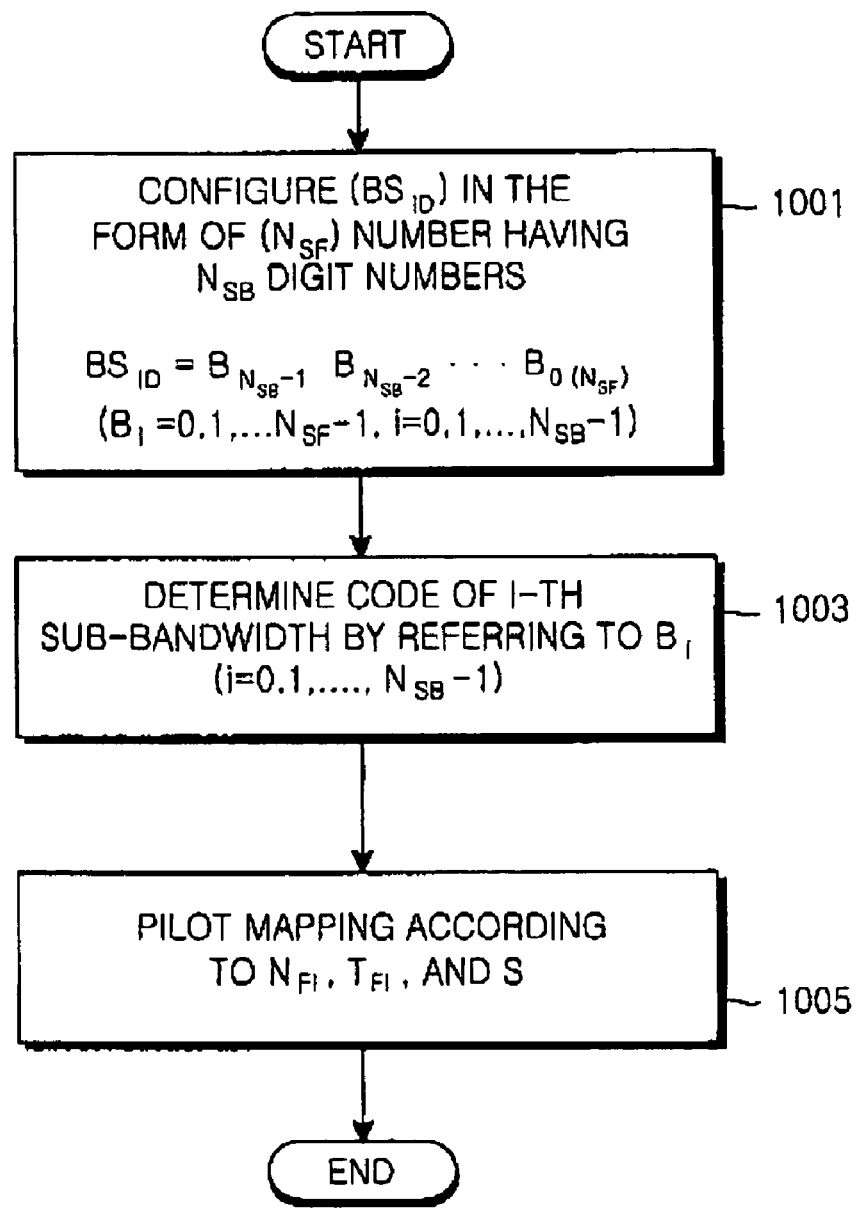
FIG. 10 is a flow chart illustrating a pilot code generation pattern for use in an OFDMA-CDM system in accordance with a preferred embodiment of the present invention.

FIG. 10 is a flow chart illustrating the pilot code generation pattern for use in an OFDMA-CDM system in accordance with a preferred embodiment of the present invention.

Referring to FIG. 10, a BSID can be represented by Equation 1 configured in the form of a $N_{SF}$ number having $N_{SB}$ digit numbers (where $N_{SB}$ is the number of the FCs), such that the spreading codes for every FC (i.e. sub-bandwidth) can be determined using the BSID at step 1001.

$$BS_{ID}=[B_0,B_1,\ldots,B_{N_{SB}-1}]_{(N_{SF})} \quad (1)$$

With reference to Equation 1, $B_i$ is one of 0, 1, ..., $N_{SF}$-1, and i is equal to 0, 1, ..., $N_{SB}$-1.

A spreading code to be used in individual sub-bandwidths is determined at step 1003 using $B_i$(i=0,1, ..., $N_{SB}$-1) having been calculated at step 1001. For example, if $B_i$ is determined to be 3, i.e. if $B_i$=3, a pilot signal is spread in the form of a $C_3$ code in the i-th sub-bandwidth. As can be seen from FIG. 3, it should be noted that the 0-th sub-bandwidth uses $C_0$, the first sub-bandwidth uses $C_1$, and the ($N_{SB}$-1)-th sub-bandwidth uses $C_{N_{SF}-1}$. A pilot mapping process is performed according to a pilot frequency interval $N_{FI}$, a pilot time interval $N_{TI}$, and the slope S at step 1005.

General channel estimation is performed using the mapped pilot signal, such that the pilot frequency interval must be determined by taking into consideration a coherence band interval. The pilot signal time interval must also be determined by taking into consideration the coherence time interval. Therefore, it is preferable for the slope S to be determined while taking into consideration the two conditions.

A pilot mapping process for use in the OFDMA-CDM system will hereinafter be described with reference to FIG. 11.

Figure 11:
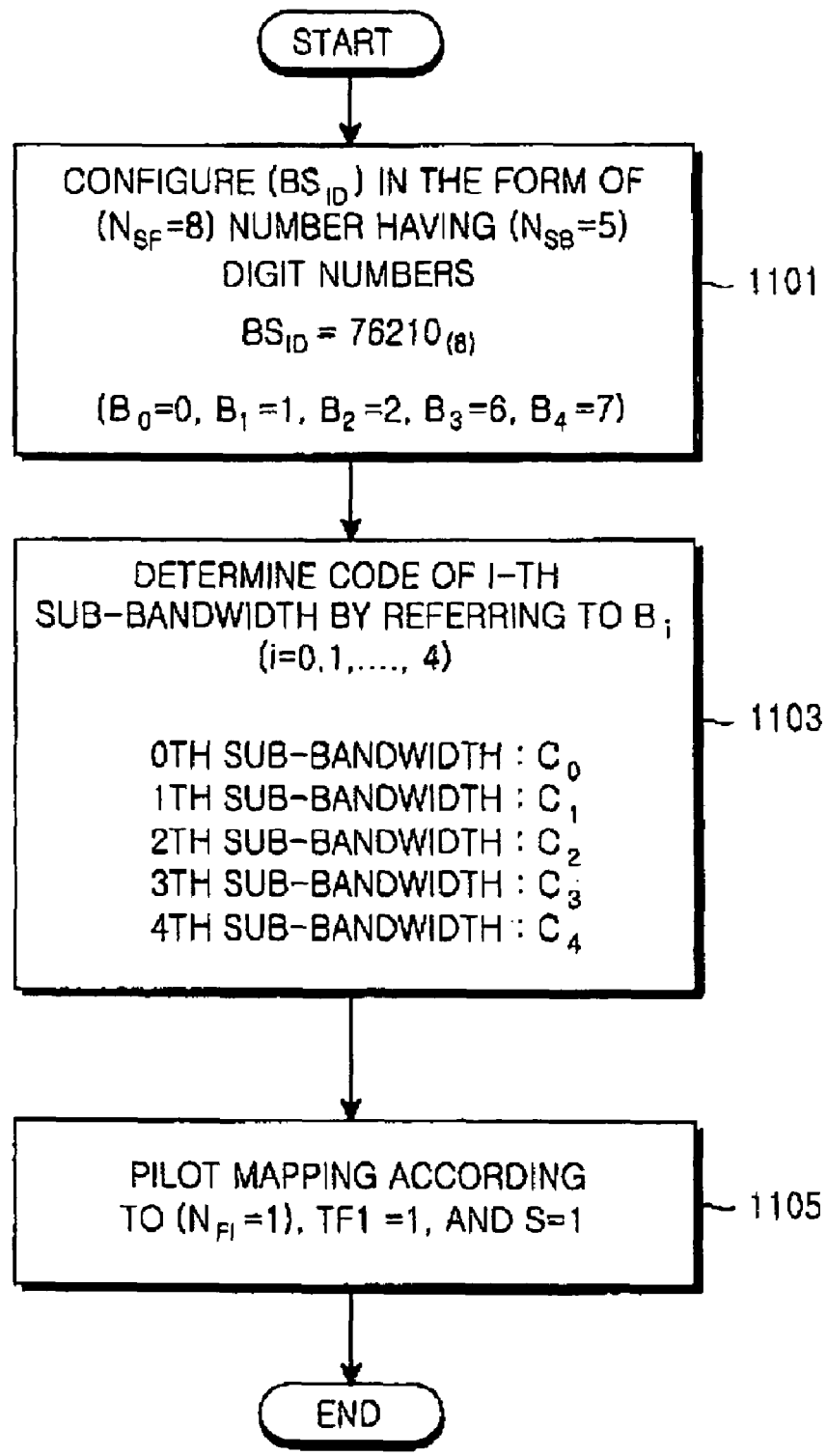
FIG. 11 is a flow chart illustrating a method for generating a pilot code generation pattern for use in an OFDMA-CDM system in accordance with a preferred embodiment of the present invention.

FIG. 11 is a flow chart illustrating a method for generating a pilot code generation pattern for use in an OFDMA-CDM system in accordance with a preferred embodiment of the present invention.

Referring to FIG. 11, a BSID can be represented by Equation 2 configured in the form of an octal number having five digit numbers equal to the number of the FCs, such that spreading codes for every FC (i.e., sub-bandwidth) can be determined using the BSID at step 1101.

$$BS_{ID}=[76210]_{(8)} \quad (2)$$

In brief, $B_0$=0, $B_1$=1, $B_2$=2, $B_3$=6, and $B_4$=7. A spreading code to be used in the individual sub-bandwidths is determined at step 1103 using $B_i$(i=0,1,2,3,4) having been calculated at step 1101. In more detail, the 0-th sub-bandwidth uses $C_0$, the first sub-bandwidth uses $C_1$, the second sub-bandwidth uses $C_2$, the third sub-bandwidth uses $C_6$, and the fourth sub-bandwidth uses $C_7$. Thereafter, a pilot signal mapping process is performed according to a pilot signal frequency interval $N_{FI}$=1, a pilot signal time interval $N_{TI}$=1, and the slope S=1 at step 1105. If the aforementioned values are determined to be '1' in the same manner as in FIG. 4, the pilot signal is mapped with all the TFCs.

As apparent from the above description, the present invention divides a time-frequency domain into a plurality of sub-bandwidths and a plurality of sub-time intervals, such that a pilot signal sub-block is configured. The present invention combines the pilot patterns according to the pilot signal sub-blocks, and distinguishes BSs of the OFDMA-CDM system from each other, such that it can increase the number of distinguishable BSs. In conclusion, the present invention effectively uses limited radio resources (i.e. limited pilot pattern resources), resulting in improved overall system performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for mapping a pilot signal to a time-frequency cell in an OFDMA (Orthogonal Frequency Division Multiple Access) wireless communication system, in which the time-frequency cell includes at least one OFDM symbol and at least one sub-carrier within a signal frame cell (FC), a total frequency bandwidth of the OFDMA system is divided into at least one sub-bandwidth including a plurality of sub-carriers, and the FC includes one sub-bandwidth of the at least one sub-bandwidth and at least one OFDM symbol interval, the method comprising the steps of:
  a) spreading a pilot signal using a first orthogonal code and a data signal using a second orthogonal code different from the first orthogonal code;
  b) combining the spread pilot signal and the spread data signal; and
  c) mapping the combined signal to a predetermined time-frequency cell in the FC.

2. The method according to claim 1, wherein the first orthogonal code is used to identify a BS (Base Station).

3. The method according to claim 1, wherein the combined signal is mapped to the time-frequency cell in the FC according to a predetermined pattern distinguishable by each BS.

4. The method according to claim 3, wherein the mapping pattern is determined by a slope of a time-frequency domain.

5. The method according to claim 4, wherein the slope is '1', and is adapted to map the combined signal to all the time-frequency cells contained in the FC.

6. The method according to claim 1, wherein when the OFDMA wireless communication system includes a plurality of FCs, a plurality of orthogonal codes for pilot signals of the plurality of FCs are different from each other.

7. A method for distinguishing a Base Station (BS) by mapping a pilot signal to a time-frequency cell in an OFDMA (Orthogonal Frequency Division Multiple Access) wireless communication system, in which the time-frequency cell includes at least one OFDM symbol and at least one sub-carrier within a single frame cell (FC), a total frequency bandwidth of the OFDMA system is divided into at least one sub-bandwidth including a plurality of sub-carriers, and the FC includes one sub-bandwidth of the at least one sub-bandwidth and at least one OFDM symbol interval, the method comprising the steps of:
  a) determining an orthogonal code for each FC such that the orthogonal code is used for a CDM (Code Division Multiplexing) signal processing according to a BSID (Base Station Identifier);
  b) spreading a pilot signal for each FC using the determined orthogonal code, spreading a data signal to be transmitted using a code other than the determined orthogonal code;
  c) combining the spread pilot signal and the spread data signal; and
  d) mapping the combined signal to a predetermined time-frequency cell contained in the FC.

8. The method according to claim 7, wherein the orthogonal code is determined to identify a BS (Base Station).

9. The method according to claim 7, wherein the combined signal is mapped to the time-frequency cell in the FC according to a predetermined mapping pattern distinguishable by each BS.

10. The method according to claim 9, wherein the mapping pattern is determined by a slope of a time-frequency domain.

11. The method according to claim 10, wherein the slope is '1', and is adapted to map the combined signal to all time-frequency cells contained in the FC.

12. A method for receiving a pilot signal mapped to a time-frequency cell in an OFDMA (Orthogonal Frequency Division Multiple Access) wireless communication system, in which the time-frequency cell includes at least one OFDM symbol and at least one sub-carrier within a single frame cell (FC), a total frequency bandwidth of the OFDMA system is divided into at least one sub-bandwidth including a plurality of sub-carriers, and the FC includes one sub-bandwidth of the at least one sub-bandwidth and at least one OFDM symbol interval, the method comprising the steps of:
  a) performing an FFT (Fast Fourier Transform) processing of a reception signal for each FC, and despreading the FFT result using a plurality of orthogonal codes of pilot signals for distinguishing BSs; and
  b) selecting an orthogonal code corresponding to a maximum value from among the despreading results
  wherein the reception signal is generated by spreading the pilot signal using a first orthogonal code and a data signal using a second orthogonal code different from the first orthogonal code, combining the spread pilot signal and the spread data signal and mapping the combined signal to the time-frequency cell in the FC.

13. The method according to claim 12, further comprising the step of:
  c) despreading the reception signal using at least one orthogonal code used for a CDM-signal processing in each FCs, and detecting the data signal.

14. The method according to claim 13, wherein the data signal is multiplexed with the pilot signal using the second orthogonal code other than the selected orthogonal code.

15. An apparatus for mapping a pilot signal to a time-frequency cell in an OFDMA (Orthogonal Frequency Division Multiple Access) wireless communication system, in which the time-frequency cell includes at least one OFDM symbol and at least one sub-carrier within a single frame cell (FC), a total frequency bandwidth of the an OFDMA wireless communication system is divided into at least one sub-bandwidth including a plurality of sub-carriers, and the FC includes one sub-bandwidth of the at least one sub-bandwidth and at least one OFDM symbol interval, the apparatus comprising:
  a pilot code pattern set generator for determining a first orthogonal code for each FC, wherein the first orthogonal code is used to perform a CDM (Code Division Multiplexing) pilot signal processing according to a BSID (Base Station Identifier);
  a pilot spread-spectrum unit for spreading the pilot signal using the first orthogonal code;
  a data spread-spectrum unit for spreading a data signal using a second orthogonal code other than the first orthogonal code;
  an adder for adding the pilot signal spread by the first orthogonal code and the data signal spread by the second orthogonal code in each FCs; and
  an IFFT (Inverse Fast Fourier Transform) unit for mapping the added signal to a predetermined time-frequency cell contained in the FC.

16. The apparatus according to claim 15, wherein the first orthogonal code is adapted to identify a (Base Station(BS).

17. The apparatus according to claim 15, wherein the added signal is mapped to the time-frequency cell in the FC according to a predetermined mapping pattern distinguishable by each BS.

18. The apparatus according to claim 17, wherein the mapping pattern is determined by a slope of a time-frequency domain.

19. The apparatus according to claim 18, wherein the slope is '1', and is adapted to map the combined signal to all the time-frequency cells contained in the FC.

20. An apparatus for mapping a pilot signal to a time-frequency cell in an OFDMA (Orthogonal Frequency Division Multiple Access) wireless communication system, in which the time-frequency cell includes at least one OFDM symbol and at least one sub-carrier within a single frame cell (FC), a total frequency bandwidth of the an OFDMA wireless communication system is divided into at least one sub-bandwidth including a plurality of sub-carriers, and the FC includes one sub-bandwidth of the at least one sub-bandwidth and at least one OFDM symbol interval, and receiving the assigned pilot signal, the apparatus comprising:

an FFT (Fast Fourier Transform) unit for performing an FFT process of a reception signal for each FC; and a BS (Base Station) detector for despreading the reception signal using a plurality of orthogonal codes of pilots signals for distinguishing BS in order to select an orthogonal code corresponding to a maximum valued from among the despreading results wherein the reception signal is generated by spreading the pilot signal using a first orthogonal code and a data signal using a second orthogonal code different from the first orthogonal code, combining the spread pilot signal and the spread data signal and mapping the combined signal to the time-frequency cell in the FC.

21. The apparatus according to claim 20, further comprising:

at least one data despreader for despreading the reception signal using at least one orthogonal code, used for a CDM process in the each FC, and detecting the data signal.

22. The apparatus according to claim 20, wherein the BS detector includes at least one maximum value detector for selecting the maximum valued to determine the orthogonal code having maximum valued from among the orthogonal codes.

* * * * *